United States Patent [19]
Jordan et al.

[11] Patent Number: 5,689,444
[45] Date of Patent: Nov. 18, 1997

[54] STATISTICAL QUALITY CONTROL OF WIND PROFILER DATA

[75] Inventors: James R. Jordan; Richard G. Strauch, both of Boulder, Colo.

[73] Assignee: The United States of America, as represented by the Secretary of Commerce, Washington, D.C.

[21] Appl. No.: 478,022

[22] Filed: Jun. 7, 1995

[51] Int. Cl.⁶ ................................................. G06F 17/60
[52] U.S. Cl. .................... 364/554; 342/26; 342/159; 342/192; 342/196
[58] Field of Search ........................... 342/25, 26, 84, 342/90, 104, 104.107, 104.114, 159, 162, 189, 192, 194, 196, 378, 460, 160, 450, 565, 94, 188, 93; 364/572, 574, 484, 571.2, 342, 554, 576, 420; 73/170.13, 170.16, 488, 861.27

[56] References Cited

U.S. PATENT DOCUMENTS

| | | | |
|---|---|---|---|
| Re. 33,152 | 1/1990 | Atlas | 342/26 |
| 3,251,057 | 5/1966 | Buehler et al. | 343/5 |
| 3,525,095 | 8/1970 | Cordry | 343/7 |
| 4,575,723 | 3/1986 | Turner et al. | 343/7.7 |
| 4,600,925 | 7/1986 | Alitz et al. | 343/5 SA |
| 4,622,555 | 11/1986 | Doggett et al. | 342/84 |
| 4,684,950 | 8/1987 | Long | 342/94 |
| 4,728,952 | 3/1988 | Residois | 342/26 |
| 4,811,020 | 3/1989 | Montheil | 342/159 |
| 4,835,536 | 5/1989 | Piesinger et al. | 342/26 |
| 4,881,077 | 11/1989 | Jehle et al. | 342/26 |
| 4,928,131 | 5/1990 | Onozawa | 342/188 |
| 4,940,988 | 7/1990 | Taylor, Jr. | 342/93 |
| 4,963,888 | 10/1990 | Taylor, Jr. et al. | 342/90 |
| 5,177,487 | 1/1993 | Taylor, Jr. et al. | 342/159 |
| 5,359,330 | 10/1994 | Rubin et al. | 342/26 |
| 5,469,168 | 11/1995 | Anderson | 342/26 |
| 5,544,525 | 8/1996 | Peterman et al. | 73/170.13 |

OTHER PUBLICATIONS

Strauch et al, "The Colorado Wind Profiling Network", *Journal of Atmospheric and Oceanic Technology*, v. 1, No. 1, 3/84, pp. 37–49.

Dušan S. Zrnić, "Simulation of Weatherlike Doppler Spectra and Signals" *Journal of Applied Meteorology*, v. 14, 6/75, pp. 619–620.

*Primary Examiner*—Emanuel T. Voeltz
*Assistant Examiner*—Cuong H. Nguyen
*Attorney, Agent, or Firm*—Michael de Angeli

[57] ABSTRACT

The quality of wind profiling radar data is evaluated by comparing the probability density function of the power density of sets of returned samples to an exponential function. The standard deviation of individual samples from the exponential function can be evaluated to identify possible sources of contamination of the wind profiler data.

20 Claims, 6 Drawing Sheets

CUMULATIVE PDF FOR UNCONTAMINATED CLEAR AIR

CUMULATIVE PDF FOR RAIN

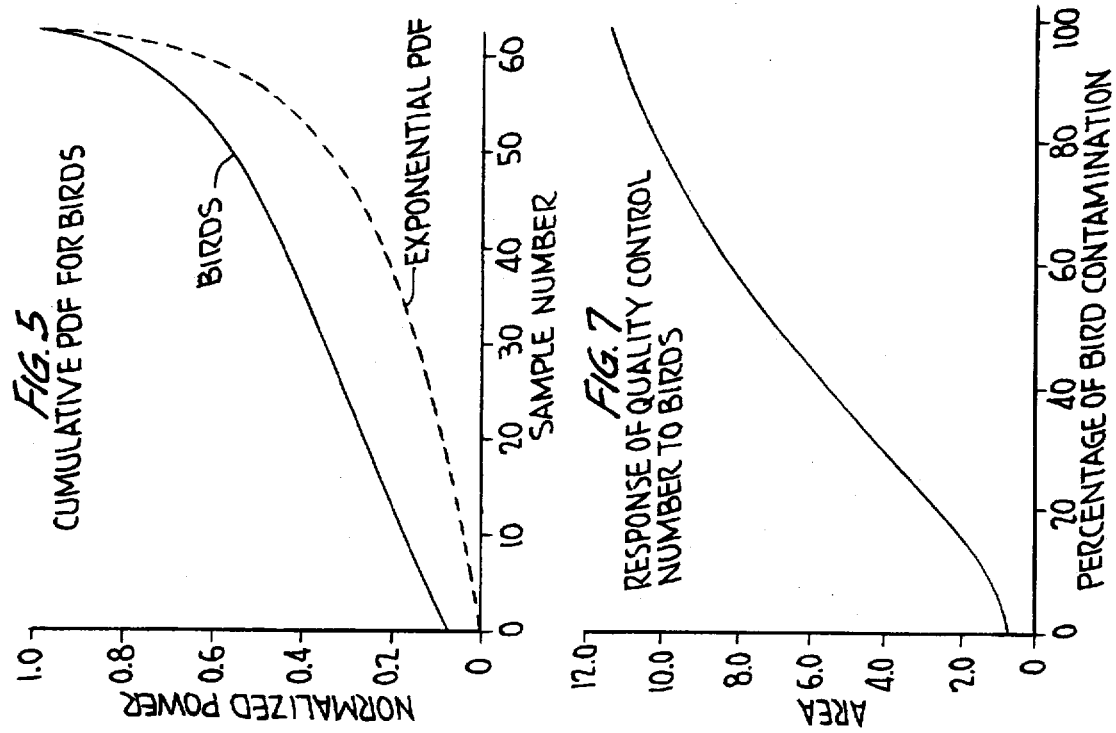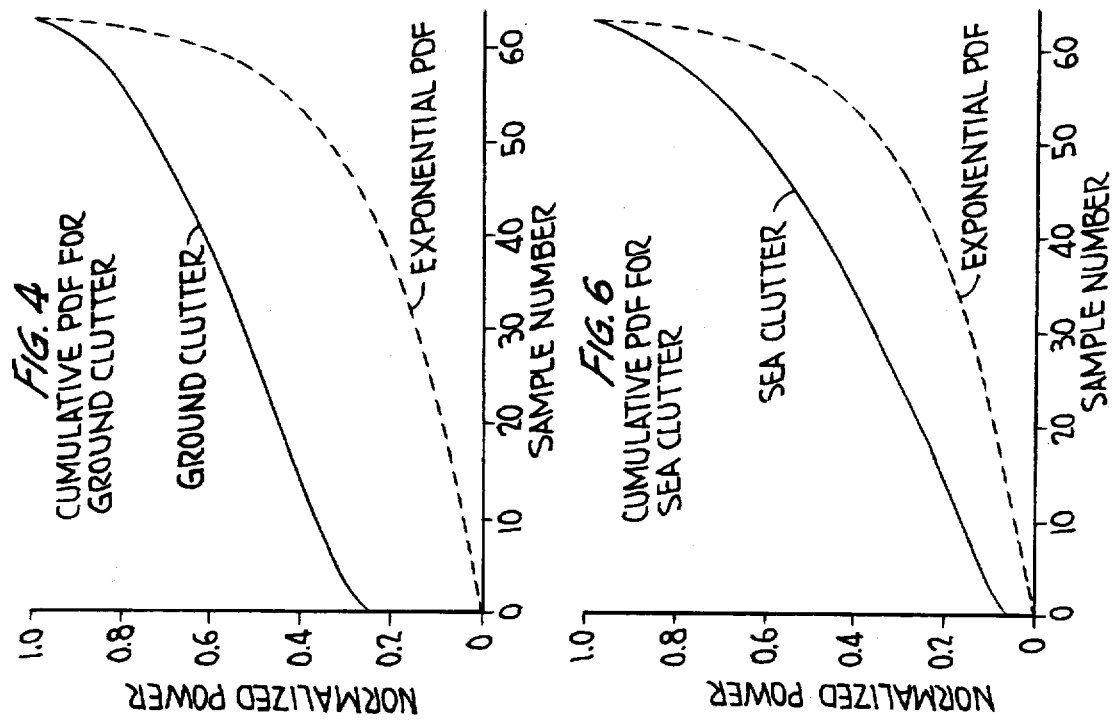

STATISTICAL QUALITY CONTROL OF WIND PROFILER DATA

FIELD OF THE INVENTION

This invention relates to methods for evaluating wind profiler data, that is, to methods for evaluating the accuracy of measurements of wind velocity and direction in the atmosphere, and for evaluating the amount of contamination of such wind profile data due to birds or other reflectors. This invention also includes methods of discriminating between differing sources of contamination.

BACKGROUND OF THE INVENTION

There are many applications for accurate wind profile information. Knowledge of the immediate and prevailing wind patterns is important for studying movement of air pollution and the like, for optimizing fire fighting efforts, for planning aircraft flight patterns to reduce fuel consumption, and for prediction of wind shear and other possibly dangerous wind conditions for flying, as well as for better weather prediction.

Radar systems for wind profiling have been in operation for more than a decade, at a number of locations. See Strauch et al, "The Colorado Wind-Profiling Network", *J. Atmospheric and Oceanic Tech.*, Vol. 1, no. 1, March 1984. The Strauch et al reference discusses in detail the practice of wind profiling and also provides details and examples of a network of five wind profiling radars in the Colorado area. The present invention relates generally to improvement of the understanding of data gathered using this or similar wind profiling radar systems; where details of the method of the invention are not set forth in detail, they are generally as disclosed by Strauch et al.

The basic process for monitoring the velocity of winds in the atmosphere using radar is as follows. Pulses of high-frequency power are directed into selected areas of the sky at regular intervals. Power back-scattered from all manner of reflectors, including birds, aircraft, wires, and foliage, as well as the ground, the sea, buildings, and the like is detected. Various processes are known for separating the components of the total power received according to the various reflectors.

Radar pulses reflected from turbulence in the atmosphere can be detected and discriminated to provide indication of the wind velocity. More specifically, some of the radar power in the pulses is reflected back towards the transmitting antenna by turbulence, that is, temperature and humidity gradients in the atmosphere. Since the turbulence is distributed randomly throughout the region of the atmosphere illuminated by the transmitted pulses, the back-scattered return signal measured by the radar exhibits rapid fluctuations. By comparison, signals returned from point reflectors such as airplanes, or ground clutter, that is, reflection from the ground, buildings, power lines, or foliage, are normally sine waves with little randomness. Accordingly, it is relatively straightforward to discriminate the return signal from clear air or rain—that is, the "meteorological" return—from the return from airplanes or ground clutter. However, discriminating the return from meteorological reflectors from that caused by birds or insects is more problematic.

More specifically, the wind velocity at any particular point in time and space is measured responsive to the Doppler shift of the received reflected electromagnetic radar pulses. The Doppler shift is determined by the difference in frequency between the transmitted and received signals. The difference in frequency is split into two channels, the in-phase or I and quadrature-phase or Q channels. Comparison of these two values allows determination of the wind direction. Typically, a series of I and Q values are sampled to produce a time series 64 samples long. The Fourier transform of this set of samples is then calculated to determine a Doppler spectrum of that set of samples. This process may be repeated 25–100 times, the whole process consuming 15–60 seconds, and the spectra thus generated summed to produce an averaged Doppler signal indicating the average velocity of the wind in that particular region of the atmosphere at that particular time. This process is then repeated at a number of regions of the atmosphere and over a period of time, to generate a complete wind profile. See, e.g., FIG. 10 of the Strauch et al paper.

Prior to the present invention, there has been no effective way to determine the likelihood that the reflected energy is in fact due to meteorological sources, e.g., wind or precipitation in the air, rather than birds, trees, or other forms of clutter. That is, while various methods of clutter removal are known, it is not always possible to rely on the efficiency of these methods to ensure that wind profiles are accurate. It would be preferable to measure the amount of "contamination" in the samples analyzed to measure the wind velocity. Further, given that there is in fact contamination, it would be desirable to be able to identify its source.

OBJECTS OF THE INVENTION

It is therefore an object of the invention to provide a wind profiling radar system capable of measuring the quality of wind profile data, that is, to determine the reliability of wind profile data, by discriminating between radar signals returned from turbulence or rain in the air and contaminating reflectors such as trees or birds.

It is a further object of the invention to determine the source of contamination given that some minimum degree of contamination exists, that is, to discriminate between various possible sources of contamination.

SUMMARY OF THE INVENTION

According to the present invention, the reliability and accuracy of wind profiling data is determined by comparing a probability density function (PDF), preferably the cumulative distribution function (CDF), of the power density of a set of radar return data to an exponential function, corresponding to the PDF of the power density of returns from meteorological reflectors. The difference between the two PDFs is inversely indicative of the quality of the wind profiling data.

Stated differently, it is known generally that the PDF of the power densities of radar returns from turbulence or rain, that is, from meteorological reflectors, obeys an exponential function. The PDF of the power densities of radar returns from birds, aircraft, trees, ground clutter, or the like, does not conform to an exponential probability density function. Accordingly, by comparing the PDF of the power densities of radar return data to a suitably scaled exponential PDF, the "quality" of the wind profiler data, that is, the likelihood that the return is due to turbulence or rain, can be determined.

When the quality value indicates that a substantial portion of the return data being analyzed is due to non-meteorological contamination, the source of the contamination can be identified to a degree by measuring the standard deviation of the measured PDF from the known PDF. Again, stated somewhat differently, the typical variation in power density of returns from contaminating reflectors varies in character with the class of reflectors, such that the reflectors contributing to the contamination can be identified by monitoring the variation of the probability density function. Conveniently, this step is carried out by calculating the standard deviation of the quality control values.

BRIEF DESCRIPTION OF THE DRAWINGS

The invention will be better understood if reference is made to the accompanying drawings, in which:

FIGS. 2–6 show graphs comparing cumulative distribution functions (CDFs) for clear air, rain, ground clutter, birds, and sea clutter, respectively, to an exponential CDF;

FIG. 7 shows the variation in the quality control number calculated according to the invention with respect to the amount of bird contamination of the reflection data;

DETAILED DESCRIPTION OF THE PREFERRED EMBODIMENTS

As indicated generally above, wind profiling radars have been used for more than a decade to monitor turbulence at spaced locations in the atmosphere over time to generate wind profiles. The process used in one successful wind profiling application is described in the Strauch et al paper referred to above.

One of the persistent problems in wind profiling arises from the fact that the radar return from turbulence, which is indicative of wind, is very small as compared to the radar return from various sorts of contamination such as birds, aircraft, power transmission wires, trees, and the like. The prior art is replete with efforts to separate out various types of signals contributing to radar return, in particular to separate ground clutter, sea clutter, birds, aircraft, foliage and the like from one another and from meteorological returns, that is, from turbulence and rain, in order to generate wind profiles.

The present invention provides a method which, instead of separating the radar return due to wind or the like from radar return due to birds or other clutter per se, as in the prior art, instead provides an objective indication of the reliability of the return ascribed to meteorological reflectors, i.e., indicates the "quality" of the radar return being analyzed to measure the wind velocity. According to the invention, a quality control value is determined which allows objective evaluation of the reliability of each datum of a large amount of wind velocity data used in wind profiling. According to a further aspect of the invention, the sources of the contamination may also be identified with a useful degree of reliability by a further evaluation step.

Figure 1:
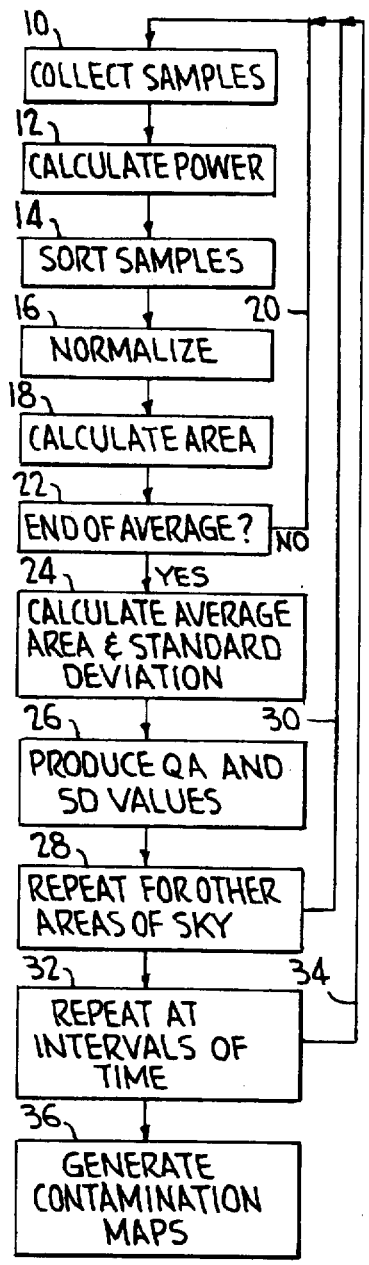
FIG. 1 shows a flow chart of the principal processing steps according to the method of the invention.

FIG. 1 shows the principal steps in the method of the invention for calculation of the quality control values and the contamination source identification.

The fundamental principle of the invention relies on the known fact that the power density of radar signals returned from meteorological reflectors, such as rain or turbulence, obey an exponential probability distribution function. When wind velocities are sought to be measured by radar, a pulsed radar signal is transmitted into an area of the sky at intervals, and the intensity of energy reflected is measured. The values for the intensity of the reflected energy, that is, the power density values corresponding to each pulse, obey an exponential probability density function (PDF) if the reflections are solely from meteorological reflectors, i.e., turbulence or rain. That is, the vast majority of radar returns from meteorological reflectors will be of relatively low power density values, and fewer of the power density values will exhibit higher returned energies. Stated differently, the probability of a return signal of a particular power density being detected is described by an exponential function. Essentially this is simply because it is unlikely that a substantial amount of energy will be reflected from turbulence in the air, or from rain. It is known that the decreasing likelihood of measurement of increased power densities of the radar returns from such meteorological reflectors can be described mathematically by an exponential function.

By comparison, the power densities of radar signals reflected from other classes of reflectors, such as birds, wires, trees, aircraft and the like, obey different PDFs. According to an important aspect of the invention, the statistical characteristics of the radar return are compared to an exponential function in order to determine whether in fact the radar return signals are reflected from meteorological sources, that is, wind or rain, as opposed to some other source.

FIG. 1 shows broadly the steps in this process. At step 10, a set of samples of the reflected energy are collected. These are simply a series of values for the intensity of the reflected energy. Typically both in-phase (I) and quadrature-phase (Q) components of the reflected energy are detected, as these values are necessary in order to calculate the wind velocity (i.e., speed and direction) according to the usual technique used in the Strauch paper referred to above. However, this is not literally necessary to the practice of the invention. In step 12, the power density of the reflected energy is calculated. Where the samples each consist of an I and Q component, the power density is simply $I^2+Q^2$; again, the exact means by which the power density is calculated is not itself critical to the present invention.

The calculated values of the power density are then sorted at step 14 and normalized at step 16; that is, the power density samples are all ordered and multiplied by a scale factor such that their values range from zero to one. This set of ordered and normalized values represents the cumulative distribution function (CDF) of the power densities of the set of samples. Calculation of the CDF by ordering and normalizing the values simplifies their comparison with a stored set of values also ranging from zero to one, but known to conform to an exponential function, that is, to a stored CDF of an exponential function. The comparison step is carried out in step 18; effectively, the area between a curve representing the sorted and normalized samples and a curve representing a corresponding set of stored samples fitting an exponential function is calculated. Conveniently, the area is calculated simply by summing the differences between each of the sorted and normalized set of samples and the corresponding members of the stored set of samples.

This process is repeated as indicated by a return loop 20 until a desired number of areas have been thus calculated in repeated performance of steps 10–18. At the chosen time, determined in decision step 22, the average area is calculated at step 24. The average area is equivalent to the quality control number for that group of sets of samples. That is, each set of samples, typically 64 each of I and Q samples, is processed through steps 10–18 to calculate a single area value. This process is repeated typically between 25 and 100 times, over a period of 15–60 seconds, so that 25 to 100 individual area values are calculated. These are then averaged at step 24; the average value of the areas indicates the average deviation of the power densities measured from the exponential function. Accordingly, the average area value thus calculated indicates the "quality" of all the sets of wind samples gathered during that 15–60 second period, i.e., indicates the degree to which the determined values of the wind velocity calculated for the corresponding period are contaminated by non-meteorological reflectors such as birds or the like.

In step 24, the standard deviation of the individual values for the areas calculated in step 18 is also calculated. As will be understood by those of skill in the art, calculation of a standard deviation in effect provides statistical determination of the amount by which individual values of a set depart from the average value; that is, the standard deviation of a set of values indicates the degree of randomness or variability of the individual values. It has been found by the present inventor that the standard deviation of the area provides an indication of the source of contamination, while as indicated the degree of contamination can be evaluated by the average departure of the CDF of the power density of the radar return from an exponential function. Birds, for example, provide relatively high radar returns, but in a relatively random fashion, such that the presence of returns from birds in a particular set of samples leads to relatively great departure of that set from the average area values. By comparison, trees blowing in the wind contaminate the measured wind values in a more uniform fashion. Thus, a high value for the standard deviation indicates contamination by birds, as opposed to a lower value, suggesting that the wind velocity values are contaminated by radar return from trees or other relatively consistent sources.

Therefore, in step 26, in accordance with a further significant aspect of the invention, the average area is used to produce a quality assurance (QA) value and the standard deviation of the individual area values is used to produce an standard deviation (SD) value. These values can then be used (in a manner discussed in detail below) to evaluate the relative reliability of wind velocity values having been determined by processing the same samples using known techniques.

Figure 10:
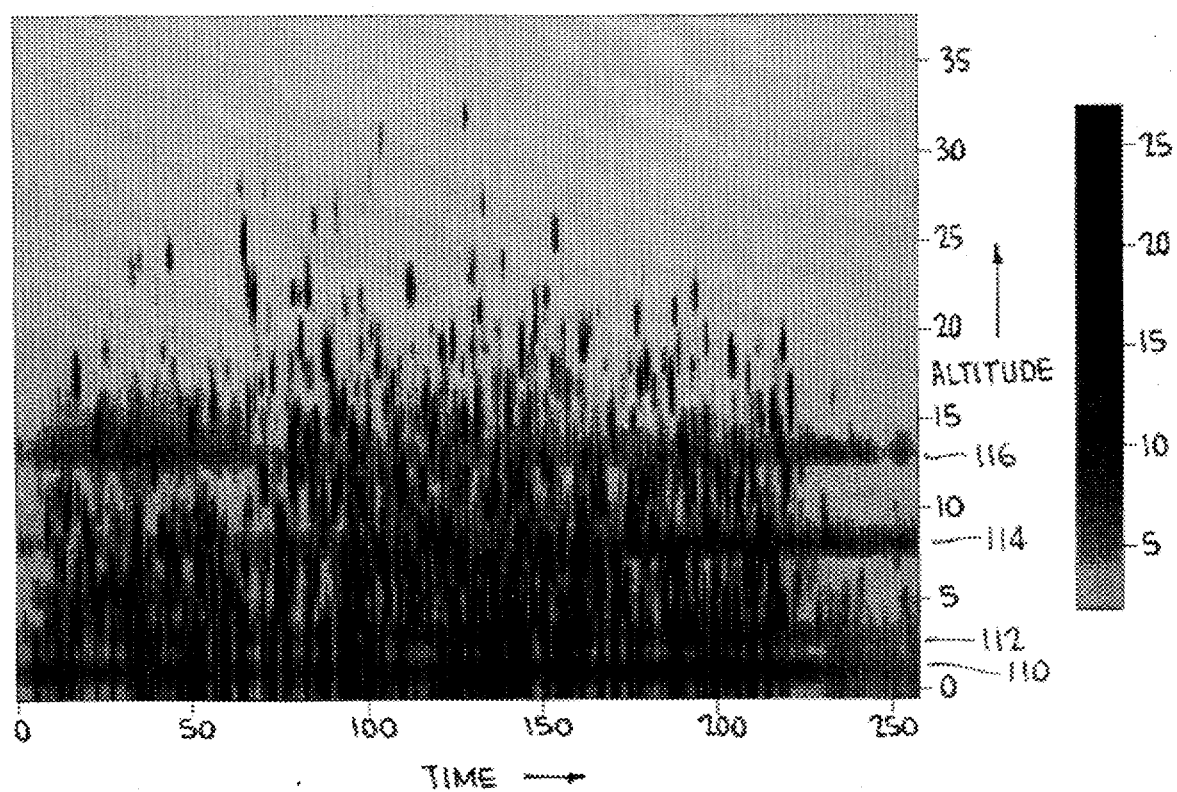
FIG. 10 shows a contamination map illustrating one method of usefully displaying a set of quality control values calculated according to the invention.
Figure 11:
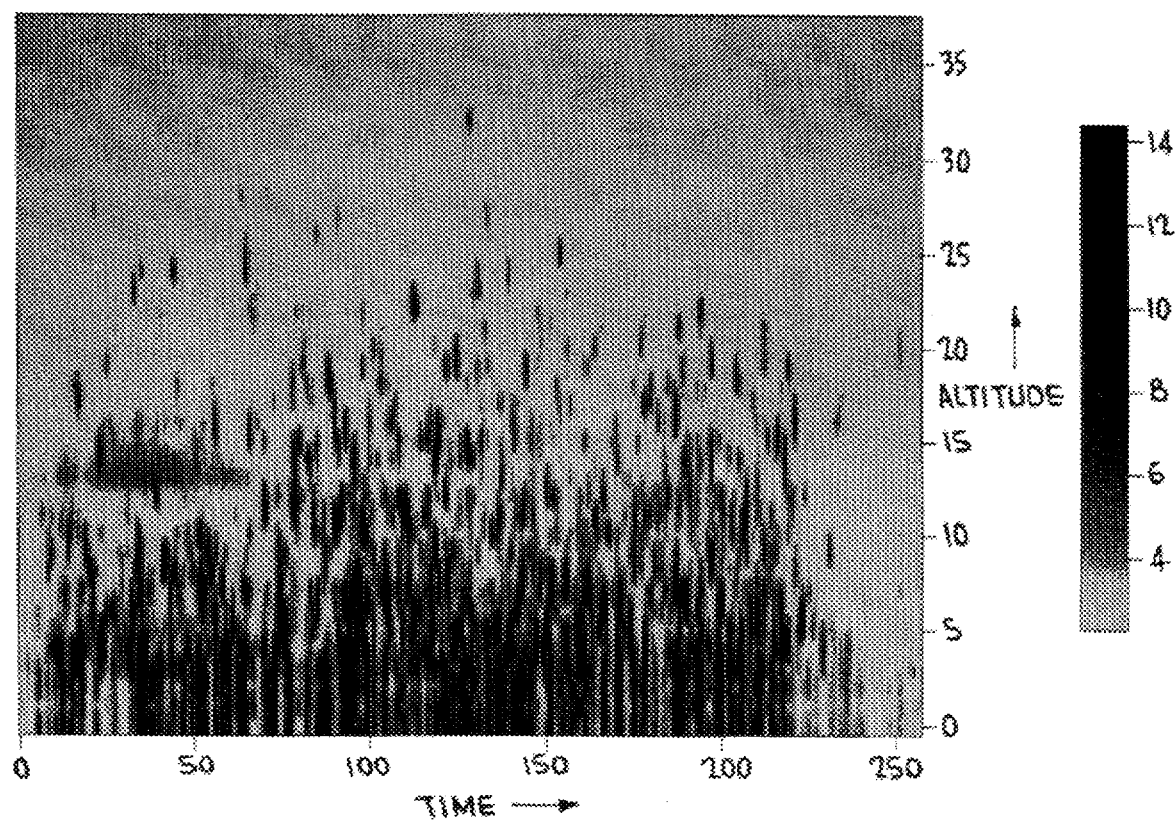
FIG. 11 shows a second contamination map comparable to that of FIG. 10, having been processed according to a further aspect of the invention to calculate the standard deviation of the quality control values.

As indicated at step 28, in a typical processing sequence, steps 10–26 are then repeated for other areas of the sky as indicated by a return loop path 30; when all areas of the sky of interest have been similarly processed, the process is begun again, as indicated at step 32 and by a second return loop 34. Thus, each area of the sky is examined in sequence, after which the entire process is begun again. Therefore, a series of values for the QA and SD values over time are provided for each region of the sky. These values may be charted as contamination maps, as indicated at 36. Examples of contamination maps showing QA values and the SD values as a function of the region of sky and the time at which the samples were taken are shown in FIGS. 10 and 11, as discussed further below. The contamination maps can then be compared to wind profiling maps, e.g., as shown at FIGS. 10 and 12 of the Strauch paper, to allow an observer to evaluate the reliability of the wind profile information shown therein.

FIGS. 2–6 compare probability density functions (PDFs) of radar return data to an exponential PDF, to illustrate the reliability of the process by which the invention identifies the presence of non-meteorological reflectors, i.e., contamination, in wind profile data. The specific PDFs shown in FIGS. 2–7 are cumulative distribution functions (CDFs). The choice of the CDF is discussed below.

Figure 2:
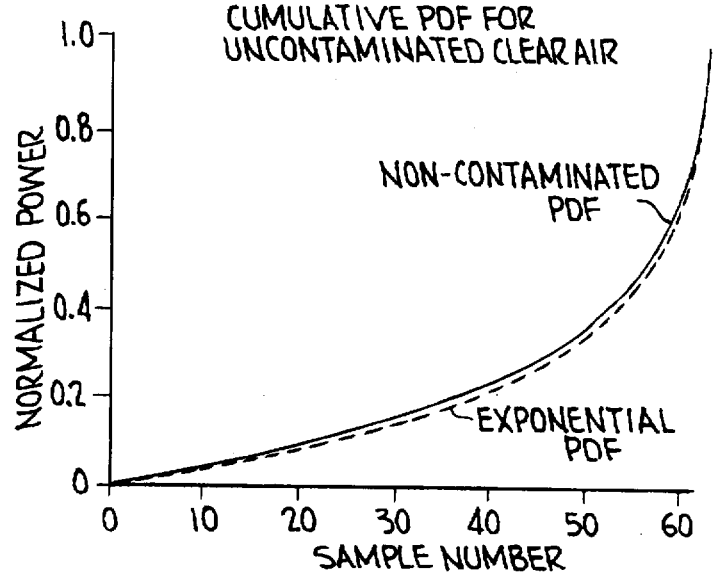

In FIG. 2, for example, the solid curve shows a PDF of radar return signals from clear air turbulence, that is, wind. The dashed curve in FIG. 2 represents a similarly scaled exponential function, that is, a series of calculated values representative of the theoretical power density of radar returns from clear air. The atmospheric return illustrated by the solid curve correlates very closely with the exponential PDF shown by the dashed curve; that is to say, the area between the two curves, which is a convenient way of evaluating the conformity of the two, is very small. Thus, the area calculated in step 18 (FIG. 1) with respect to such clear air sample data would be very low.

Figure 3:
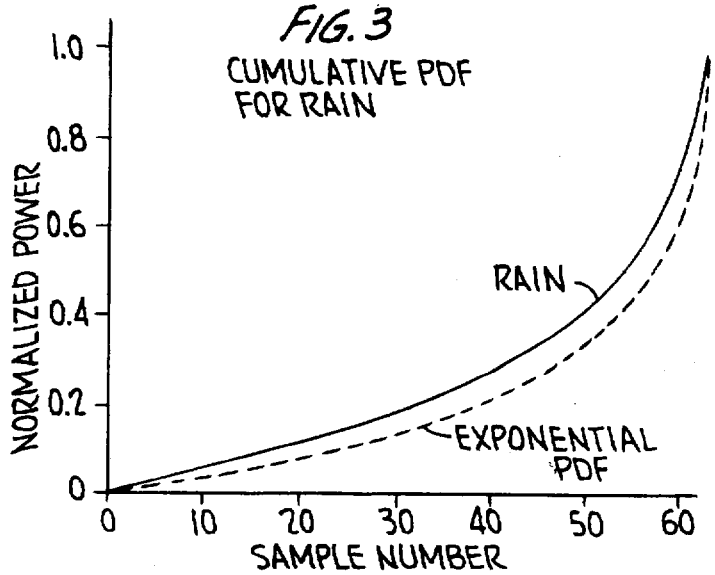

FIG. 3 shows a comparable figure, wherein the solid line shows the PDF of radar return data from rain, which is nearly exponential, but wherein the area of the difference between the rain PDF and the exponential PDF is larger than for the clear air PDF of FIG. 2.

By comparison, FIG. 4 compares a PDF for ground clutter, that is, the PDF of power density values determined with respect to radar return from the ground, to the exponential PDF. Here obviously the area between the curves is very large, such that radar return data conforming to the solid curve of FIG. 4 would be evaluated to be very highly contaminated by the method of the invention.

Similarly the PDF of radar return data from birds is compared in FIG. 5 to the exponential PDF, and again the area between the curves is quite large.

Similarly in FIG. 6, sea clutter, that is, the PDF of radar return data from the ocean, also departs very significantly from the exponential PDF shown by the dotted line.

FIG. 7 shows a somewhat different graph, illustrating the relationship between the area between a curve of a measured PDF contaminated by birds and the exponential PDF versus the percentage of bird contamination. Where the percentage of bird contamination is low, that is, on the left side of FIG. 7, the area between the curves of the exponential PDF and the PDF of the radar signal returned therefrom is similarly small; as the percentage of bird contamination increases, the area between the curves increases, such that the area between the curves might be used to evaluate the source of contamination.

However, those of skill in the art will recognize that other sources of contamination may contribute to the area between the curves, such that the area alone cannot be used as an objective identifier of the source of the contamination in all circumstances. Other information may be useful, however, in evaluating the source of contamination; for example, ground clutter and sea clutter obviously do not contribute at high elevations, where the problem is reduced to separating bird contamination from aircraft. Aircraft typically make a more uniform contribution to the contamination than do birds; therefore, according to an important aspect of the invention, the standard deviation (SD) of the individual area measurements is calculated, so as to distinguish between sources of contamination. The SD of returns from aircraft would tend to be lower than the SD of signals returned from birds. According to this aspect of the invention, the source of contamination can be identified in certain cases by consideration of the area between the curves of the radar return signal and the stored exponential PDF, by consideration of the area of the sky from which the radar return data is taken, and by calculation of the standard deviation of the areas.

Figure 8:
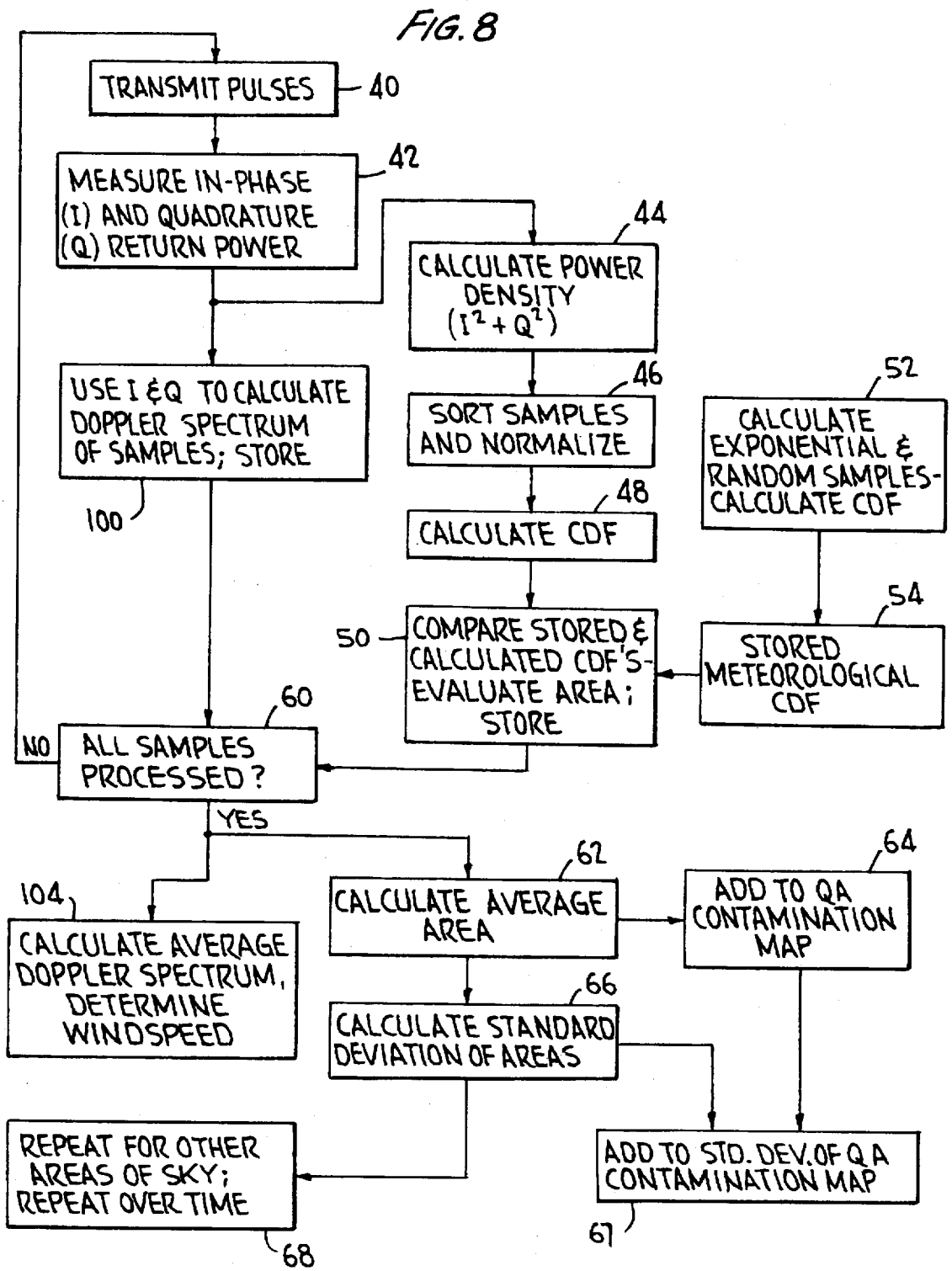
FIG. 8 shows a detailed flow chart of the steps in the process of the invention, including the steps in generating a wind profile.

FIG. 8 shows a more detailed flow diagram of processes according to the invention, providing additional detail with respect to the flow diagram of FIG. 1, and also illustrating the manner in which the invention is added to conventional wind profiling processes as described by Strauch et al. The process begins at step 40 by transmission of a set of radar pulses into a particular area of the sky. Typically 64 pulses may be transmitted in each set, although the invention is not so limited. The number of pulses in each set is normally a power of two, to simplify calculation of the wind velocity using the usual Fast Fourier Transform (FFT) algorithm, but this also is not critical to the invention claimed per se. For similar reasons, the in-phase (I) and quadrature-phase (Q) components of the return power are measured at step 42; again, the return power measured in some other way might be used to practice the invention.

The power density of the return signals is then calculated at step 44; again, where the I and Q values of the return power are monitored for use in Doppler velocity calculations, the power density is simply $I^2+Q^2$. The power density values, 64 in the example, are sorted in order of their intensity and normalized at step 46. The result is a set of ordered values ranging from zero to one. From these, the cumulative distribution function (CDF) is calculated at step 48.

As will be understood by those of skill in the art, a probability density function (PDF), of which a CDF is a particular type, essentially represents the number of samples of an overall set of values falling within each of a number of "bins" within an overall range of values. The CDF of a normalized set of samples ranges from zero to one, such that the shape of a curve showing a CDF represents the probability, between zero and one, of various possible values. In implementation of the invention, processing the power density samples to determine their CDF enables convenient computation of the difference between the CDF of the set of samples, and a stored CDF similarly ranging between zero and one, and known to correspond to an ideal exponential function. It would be mathematically equivalent to calculate the PDF of the measured set of power density values, and compare this PDF to an exponential PDF; however, it is computationally more efficient to carry out the process with respect to the corresponding CDFs instead.

Therefore, in the preferred implementation of the invention, the CDF of the power densities of each set of samples is calculated at step 48, and is compared to a stored CDF at step 50, such that the area between the curves represented by the two CDFs is evaluated; the value of the area is then stored.

Further, in connection with this invention, a CDF is to be considered a particular type of PDF. Accordingly, it is to be understood that calculation of the difference between a PDF of a set of samples and a PDF of a set of samples corresponding to an exponential function by any known means is considered to be within the scope of the invention.

The stored CDF represents an exponential function, as noted. In one preferred implementation of the invention, the stored CDF includes a set of values generated by applying an exponential function to the output of a random number generator at step 52 and stored at step 54. This set of values represents the CDF of the power density of samples from known meteorological reflectors, that is, wind and rain, for comparison to the calculated CDFs at step 50.

When all the sets of 64 samples in a given group, the group typically including 25–100 sets of samples collected over a period of 15–60 seconds, have been processed, as determined at step 60, the average area is calculated in step 62; this value is the average of the 25–100 areas determined in step 50 between the curves representing the stored CDF and the calculated CDFs. The average area becomes a single datum representing the average contamination of the return values for that particular group of sets of samples, and may be later used in step 64 to produce a QA contamination map.

Equivalently, the calculated CDFs could be averaged, and this "average CDF" compared to the stored CDF to determine an average area. However, in the preferred embodiment, the individual areas are calculated and stored so that their standard deviation (SD) can be determined, as shown at step 66. As discussed above, this calculation of the "randomness" of the individual areas used in calculating the average area is of use in identifying the possible source of the contamination.

The QA values are ultimately used to produce a contamination map in step 64, as indicated, and the SD of the areas can be used to produce an SD contamination map in step 67. The same steps, that is, calculating the average area and the SD of the areas, are repeated for groups of samples measured with respect to other areas of the sky, as indicated at step 68; when all areas of the sky have been thus evaluated, each region yielding a single point, in effect, on the QA and SD contamination maps, the same process is performed repeatedly over time, typically for 12 to 24 hours. Ultimately the result is a pair of contamination maps, as discussed below in connection with FIGS. 10 and 11.

Figure 9:
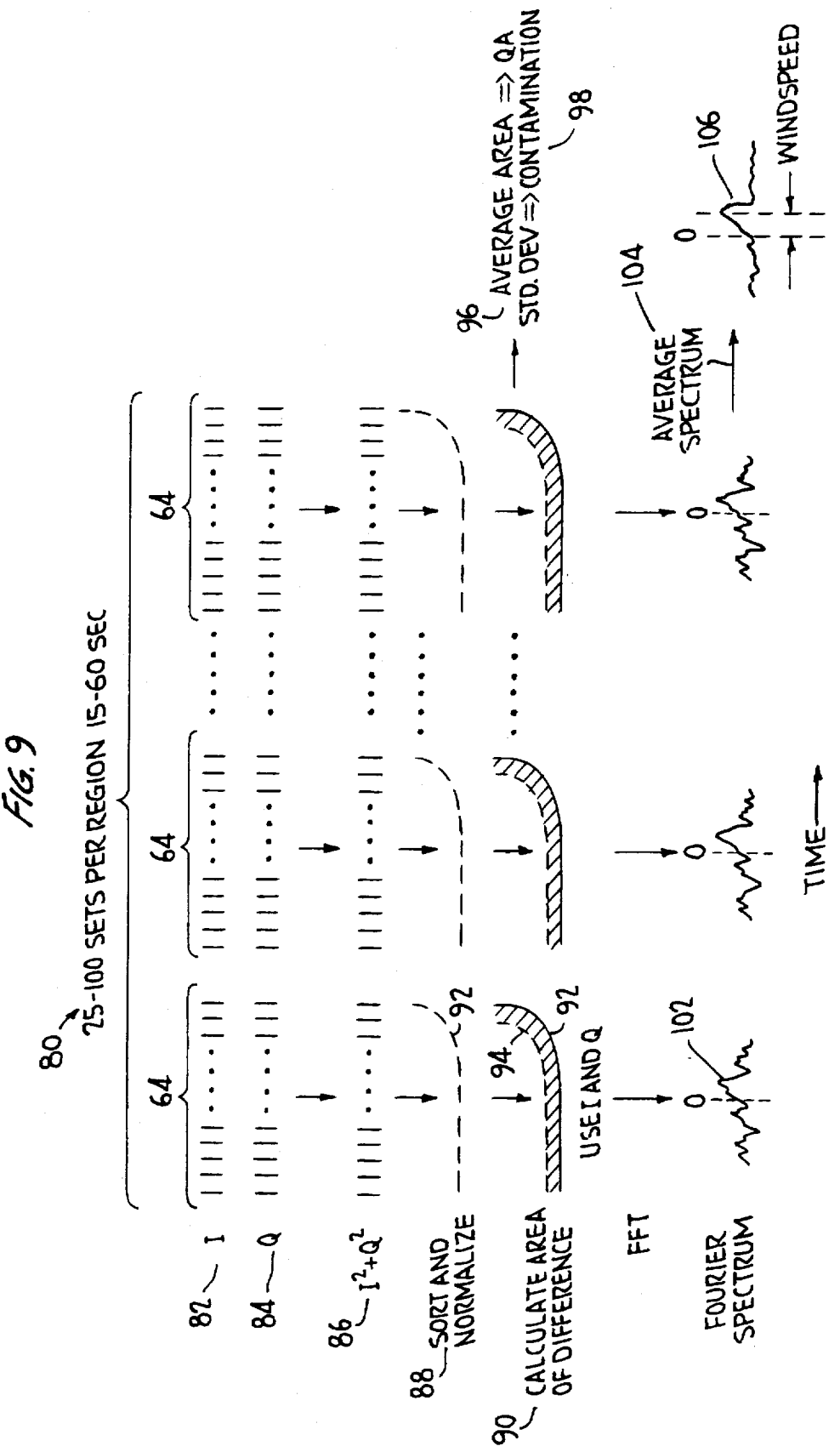
FIG. 9 shows schematically the processing of wind profiling data according to the invention as a function of time.

FIG. 9 shows schematically the processing of return signals according to the invention as a function of time. As indicated by the legend at 80, 25–100 sets of radar return samples, typically 64 samples per set, are collected from a particular region of the sky, typically over a period of 15–60 seconds. Each set of samples includes 64 values for the in-phase component (I) of the reflected energy, as indicated at 82, and 64 values for the quadrature-phase component (Q) thereof, as shown at 84. The power density of each pair of samples is calculated at step 86 as $I^2+Q^2$. These values are then sorted and normalized at 88, and processed to form their CDF. Where the radar return is in fact from meteorological sources, i.e., wind and rain, the CDF will conform to a generally exponential function. At 90, the areas between each CDF curve 92 and a curve 94 representing a set of values for the CDF of an exponential function are calculated. When each of the 25–100 sets of samples have been thus processed, the average area, that is, the average of all the areas between the curves 92 and the stored curve 94, is determined at step 96; the resulting value is the quality control number for the group of 25–100 sets of samples from a given region. The standard deviation of each area from the average area value is calculated at 98 and indicates the source of contamination of the return data from non-meteorological sources as indicated at 98.

FIGS. 8 and 9 also illustrate the manner in which the process of the invention conforms to known processes for profiling wind velocity, as disclosed in the Strauch et al paper. For example, at step 100 (FIG. 8) the I and Q values are used as indicated by Strauch et al to calculate the Doppler spectrum of the set of samples measured in response to each particular transmitted pulse of energy, and this spectrum is stored. The Fourier spectrum of a typical set of 64 samples is shown at 102 in FIG. 9; as indicated, each set of 64 I and Q values is used to generate a Fourier spectrum. These spectra are then averaged as indicated at step 104 of FIGS. 8 and 9 to yield an average spectrum as illustrated at 106 in FIG. 9. The average wind speed is determined by the principal peak appearing in the averaged Fourier spectra. This value, which represents the average wind velocity in that particular region of the atmosphere during the 15–60 second sampling time, makes up a single contribution to a wind profile, e.g., as shown in FIG. 10 of the Strauch et al paper.

According to the invention, contamination maps may be generated for evaluating the reliability of such wind profiles. FIG. 10 shows a quality assurance (QA) contamination map while FIG. 11 shows the standard deviation (SD) of the FIG. 10 map for the same time period. In FIG. 10, the axis labeled from zero through 250 represents sampling times, extending rightwardly from late afternoon through the following morning; approximately twelve hours' data is shown. The vertical axis represents altitude above the ground; in this figure, the atmosphere is divided into 38 vertical layers with a maximum height of approximately 4 kilometers. The legend showing a density scale varying between zero and approximately 27 (in arbitrary units) represents the quality control value; in this Figure, a low value represents high quality radar data, that is, indicates that the wind profiler data is relatively less contaminated, as determined according to the invention. That is, in these examples of the present invention, when the quality control number is low, the data is relatively reliable; when the quality control number is high, then the analysis carried out according to the invention indicates that a substantial fraction of the radar return used in calculating the wind speeds may include radar return from other sources, i.e., birds, trees, power lines, or the like. Thus, it will be immediately apparent that the data from near the ground is more highly contaminated than the data from higher in the atmosphere, which is hardly surprising. The bands 110, 112, 114, and 116 appearing at approximately 1, 3, 8, and 13 units of altitude of FIG. 10, can be determined according to the invention to be due to ground clutter, and are eliminated in the SD plot of FIG. 11.

The SD plot of FIG. 11 represents the contamination map of FIG. 10 having been reprocessed to show those data where the SD is relatively low as light in color and those where the standard deviation is high as darker in color. As indicated above, radar return from the relatively stationary sources such as trees, the ground and the like is relatively consistent, and its SD is low, that is, the area of the difference between the calculated CDFs and the stored CDF is consistent from sample to sample. Therefore, contamination due to the ground or the like is relatively deemphasized in the SD plot of FIG. 11. By comparison, where the standard deviation is high, e.g., due to birds or the like, which would normally contribute only to individual samples used in calculating the areas, the standard deviation is relatively high. Therefore, ground clutter is largely removed from the FIG. 11 plot as compared to FIG. 10, and the remaining contamination plotted can be presumed to be due largely to birds.

It will be appreciated by those of skill in the art that while an improved method of evaluating the quality of wind profiling data has been provided and discussed in detail, there are additional modifications and improvements thereon that could be made without departure from the invention as disclosed and claimed. Therefore, the above disclosure of the invention should be considered as exemplary only and the scope of the invention should be measured only by the following claims.

What is claimed is:

1. A method for measuring wind velocities by measuring radar return signals back-scattered from air turbulence, including evaluation of the quality of the measured wind velocity, comprising the steps of:
   determining a plurality of wind velocity spectra, each wind velocity spectrum being determined by:
      obtaining a number of sets of samples of radar return data from a particular spatial location; and
      calculating the Fourier transforms of each of said sets of samples of radar return data to determine a corresponding wind velocity spectrum; and
   averaging said plurality of spectra together in order to provide an average wind velocity value for that particular spatial location; and
   evaluating the quality of the average wind velocity thus provided, by:
      measuring the power density of the radar return data of each set of samples;
      calculating a probability density function (PDF) with respect to the measured power density values of one or more of said sets of samples;
      comparing said calculated PDF to a stored PDF, said stored PDF exhibiting variation in power density characteristic of known classes of radar reflectors; and
      determining the quality of said wind velocity value responsive to said comparison step.

2. The method of claim 1, wherein said step of calculating a probability density function (PDF) with respect to the measured power density values of one or more of said sets of samples is performed by ordering and normalizing the power densities of the radar return data of said one or more sets of samples, and employing said ordered and normalized sets of samples to calculate a cumulative density function (CDF).

3. The method of claim 1, wherein said stored PDF exhibiting variation in power density characteristic of known classes of radar reflectors exhibits exponential variation in power density, characteristic of meteorological radar reflectors.

4. The method of claim 1, wherein each PDF is calculated with respect to a set of ordered and normalized values for the power density of the corresponding set of samples of radar return data, and wherein said step of comparing said calculated PDF to a stored PDF is performed by summing the differences between each of said set of ordered and normalized values and a corresponding member of a stored set of values comprising a like number of ordered and normalized values representative of a PDF of a known class of radar reflectors.

5. The method of claim 4, wherein said stored PDF exhibiting variation in power density characteristic of a known class of radar reflectors exhibits exponential variation in power density, characteristic of meteorological radar reflectors.

6. The method of claim 5, wherein said stored PDF comprises a set of values determined by application of an exponential function to the output of a random number generator.

7. The method of claim 4, comprising the further steps of calculating the standard deviation of the differences between each of said set of ordered and normalized values and the corresponding member of the stored set of values, and using the value calculated for the standard deviation to distinguish between differing types of non-meteorological radar reflectors contaminating wind velocity data.

8. The method of claim 1, comprising the further step of generating a contamination map, showing the value of the comparison between the calculated and stored PDFs as a function of position of the spatial location and the time at which the sets of samples corresponding thereto were obtained, to identify suspect wind velocity data.

9. A method for identifying non-meteorological contribution to back-scattered radar signals as evaluated for wind profiling, comprising the steps of:
   (a) calculating the probability density function (PDF) of a measured characteristic of a number of back-scattered radar signals from a given region used in generation of a wind profiling datum;
   (b) comparing said calculated PDF to a stored PDF representative of radar signals reflected by known radar reflectors, to determine a quality assurance value indicative of the contribution of non-meteorological reflectors to the back-scattered radar signals;
   (c) repeating said steps (a) and (b) a number of times, to determine a plurality of said quality assurance values; and
   (d) evaluating the standard deviation of said plurality of quality assurance values, to identify said non-meteorological reflectors.

10. The method of claim 9, wherein said measured characteristic of a number of back-scattered radar signals is the power density thereof.

11. The method of claim 10, wherein said PDF of the power density of a number of back-scattered radar signals is determined by ordering and normalizing a set of measured values for the power density of the reflected radar signals.

12. The method of claim 11, wherein said PDF of the power density of a number of back-scattered radar signals is compared to a stored PDF representative of radar signals reflected by known radar reflectors by comparing said set of ordered and normalized values for the power density of the reflected radar signals to a set of a like number of values determined in accordance with the PDF of the power density of signals reflected by known radar reflectors.

13. The method of claim 12, wherein said set of a like number of values determined in accordance with the PDF of the power density of signals reflected by known radar reflectors conforms to an exponential PDF, characteristic of meteorological radar reflectors.

14. The method of claim 12, comprising the further step of evaluating the total difference between the PDF of the power density of a number of back-scattered radar signals and said stored PDF representative of radar signals reflected by known radar reflectors as a measure of the contamination of wind profile data by non-meteorological radar reflectors.

15. The method of claim 12, wherein said step of evaluating the standard deviation of said quality assurance values comprises the step of determining the variation of the differences between individual values of said set of ordered and normalized values for the power density of the reflected radar signals and the corresponding values of said set of a like number of values determined in accordance with the PDF of the power density of signals reflected by known radar reflectors.

16. A method of evaluating the quality of wind velocities as measured using wind profiling radar techniques, comprising the steps of:
   (1) determining a wind velocity spectrum by:
      (a) obtaining a set of samples of radar return data from a particular spatial location;
      (b) calculating the Fourier transform of said set of samples, to determine a velocity spectrum corresponding thereto;
      (c) repeating said steps (a)–(b) to determine a plurality of wind velocity spectra; and
      (d) calculating an average wind velocity value from said plurality of wind velocity spectra;
   (2) calculating the power density of the radar return data of each set of samples;
   (3) ordering and normalizing the power densities of the radar return data of each set of samples;
   (4) calculating a probability density function (PDF) with respect to each of said ordered and normalized sets of samples;
   (5) measuring the differences between the PDFs thus determined and a PDF of a set of samples corresponding to radar return data from meteorological reflectors only, to determine the amount of non-meteorological contamination in the corresponding wind velocity spectrum; and
   (6) determining an average contamination value corresponding to said average wind velocity value.

17. The method of claim 16, wherein said step of measuring the differences between the PDFs thus determined and a PDF of a set of samples corresponding to radar return data from meteorological reflectors only is performed by summing the differences between each of said set of ordered and normalized values corresponding to each PDF thus determined and a corresponding member of a stored set of ordered and normalized values representative of said PDF of a set of samples corresponding to radar return data from meteorological reflectors only.

18. The method of claim 17, wherein said PDF of a set of samples corresponding to radar return data from meteorological reflectors only exhibits exponential variation in probability with power density, characteristic of meteorological radar reflectors.

19. The method of claim 17, comprising the further steps of calculating the standard deviation of the differences between each of said set of ordered and normalized values and the corresponding member of the stored set of values, and using the value calculated for the standard deviation to distinguish between differing types of non-meteorological radar reflectors contaminating said wind velocity spectrum.

20. The method of claim 16, wherein:
   (a) said samples of radar return data from a particular spatial location each comprise an in-phase (I) and a quadrature value (Q) for the intensity of back-scattered energy detected from said particular spatial location,
   (b) said step of calculating the Fourier transform of each set of samples to determine a velocity spectrum corresponding thereto is performed using said values for I and Q of each sample, and
   (c) said step of calculating the power density of the radar return data of each set of samples is performed by calculating $I^2+Q^2$.

* * * * *